(12) United States Patent
Kasai

(10) Patent No.: US 7,675,207 B2
(45) Date of Patent: Mar. 9, 2010

(54) MOTOR DEVICE

(75) Inventor: Shigeru Kasai, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/271,996

(22) Filed: Nov. 17, 2008

(65) Prior Publication Data
US 2009/0127952 A1 May 21, 2009

(30) Foreign Application Priority Data
Nov. 15, 2007 (JP) .............................. 2007-296586

(51) Int. Cl.
*H02K 7/06* (2006.01)
(52) U.S. Cl. .................. 310/75 R; 310/49 R; 310/83; 310/90; 74/606 R; 74/421 A
(58) Field of Classification Search ............... 310/49 R, 310/75 R, 83, 90
See application file for complete search history.

(56) References Cited

U.S. PATENT DOCUMENTS

| 5,533,712 | A | * | 7/1996 | Fujikawa et al. ............ 254/362 |
| 5,748,394 | A | * | 5/1998 | Shimazaki et al. .......... 359/823 |
| 5,892,309 | A | * | 4/1999 | Dreher ......................... 310/80 |
| 6,276,160 | B1 | * | 8/2001 | Terada et al. .................. 62/353 |
| 7,075,202 | B2 | * | 7/2006 | Leoni ........................... 310/83 |
| 2007/0222313 | A1 | * | 9/2007 | Sonohara et al. .............. 310/90 |

FOREIGN PATENT DOCUMENTS

JP   2001-215395 A   8/2001

* cited by examiner

*Primary Examiner*—Quyen Leung
*Assistant Examiner*—Terrance Kenerly
(74) *Attorney, Agent, or Firm*—Cantor Colburn LLP

(57) ABSTRACT

A motor device may include a motor main body provided with a stator part and a rotation shaft, an output shaft provided with a lead screw part, a motor frame provided with an opposite-to-output side support part that supports the stator part and an opposite-to-output side of the output shaft, and which is provided with an output side support part which supports an output side of the output shaft, and a gear part for transmitting a driving force of the rotation shaft to the output shaft. The opposite-to-output side support part rotatably supports the rotation shaft and further rotatably supports the opposite-to-output side of the output shaft.

8 Claims, 8 Drawing Sheets

MOTOR DEVICE

CROSS REFERENCE TO RELATED APPLICATION

The present invention claims priority under 35 U.S.C. §119 to Japanese Application No. 2007-296586 filed Nov. 15, 2007 the entire contents of which are incorporated herein by reference.

FIELD OF THE INVENTION

At least an embodiment of the present invention may relate to a motor device. More specifically, at least an embodiment of the present invention may relate to a motor device which is provided with a rotation shaft provided in a main motor body and an output shaft to which a rotary power of the rotation shaft is transmitted.

BACKGROUND OF THE INVENTION

A motor is commonly structured such that a rotor provided with a rotation shaft is rotated by a magnetic force generated from a drive coil which is disposed on an outer peripheral side of the rotor. Normally, the rotation shaft is operated as an output shaft for transmitting a rotary power to an object to be driven. On the other hand, when inclination or rattling of the output shaft is required to restrict, for example, when an object to be driven is required to drive with a high degree of accuracy, a motor device is used which is provided with an output shaft that is provided separately from the rotation shaft. In the motor device, a rotary power of the rotation shaft is transmitted to the output shaft through a gear or the like (see, for example, Japanese Patent Laid-Open No. 2001-215395).

However, in the motor device described above, a frame supporting the rotation shaft and a frame supporting the output shaft are separately provided and thus cost of the motor device is not reduced. In addition, since dispersion may occur in a distance between the rotation shaft and the output shaft, a sufficient play (backlash) cannot be secured between a gear fixed to the rotation shaft and a gear fixed to the output shaft. As a result, engagement of the gears with each other becomes tight and thus smooth rotation is not attained. On the contrary, when a play between the gears becomes too large, noise and vibration may occur due to rattling of the gears or control accuracy for a rotation amount of the output shaft (control accuracy of an object to be driven) is deteriorated.

SUMMARY OF THE INVENTION

In view of the problems described above, at least an embodiment of the present invention may advantageously provide a motor device in which accuracy of a relative position of the output shaft to the rotation shaft is improved at a low cost.

Thus, according to at least an embodiment of the present invention, there may be provided a motor device including a motor main body which is provided with a stator part and a rotation shaft extended from the stator part, an output shaft which is provided with a lead screw part, a motor frame which is provided with an opposite-to-output side support part that supports the stator part and an opposite-to-output side of the output shaft, and which is provided with an output side support part which is disposed so as to face the opposite-to-output side support part for supporting an output side of the output shaft, and a gear part for transmitting a driving force of the rotation shaft to the output shaft. The opposite-to-output side support part is formed with a first through-hole for penetrating the rotation shaft, and a first bearing which rotatably supports the rotation shaft is held in the first through-hole, and the opposite-to-output side support part is formed with a second through-hole which holds a second bearing that rotatably supports the opposite-to-output side of the output shaft.

According to the motor device in accordance with the embodiment of the present invention, both of the first bearing which supports the output side of the rotation shaft and the second bearing which supports the opposite-to-output side of the output shaft are held in the opposite-to-output side support part provided in the motor frame. Therefore, accuracy of a relative position of the output shaft to the rotation shaft is improved and, as a result, noise and vibration during driving of the motor device can be reduced and accuracy of rotation amount control of the output shaft can be enhanced.

In this case, it is preferable that the opposite-to-output side support part and the output side support part are formed to be bent from one piece of bottom plate part, and an urging member for urging the output shaft in an axial direction is mounted on one of the support parts. According to the structure as described above, the rotation shaft and the output shaft are supported by one piece of the motor frame and thus the number of part items is reduced and assembling steps are simplified and, as a result, cost of the motor device can be reduced. Further, the output shaft is supported in the motor frame by the urging member in a stable state. As a result, inclination and rattling of the output shaft is prevented and an object to be driven can be operated smoothly.

In addition, it is preferable that the output side support part is formed at a position facing the second through-hole with a third through-hole which holds a third bearing that supports the output side of the output shaft, and one of the support parts on which the urging member is mounted is formed with a slit part which is formed from a tip end of the one of the support parts so as to reach to the through-hole that is formed in the one of the support parts. In a common motor device, an output shaft is formed longer than a distance between the output side support part and the opposite-to-output side support part of the motor frame and thus, in the conventional motor device, the output shaft is unable to be mounted on the motor frame unless the output shaft or the motor frame is elastically deformed. However, according to the embodiment of the present invention described above, the output shaft is easily mounted by means of that the output shaft is passed through the slit part provided in the support part.

In this case, it may be structured that the slit part is formed from a tip end of the opposite-to-output side support part to the second through-hole, and the gear part comprises a first gear fixed to the rotation shaft and a second gear fixed to the output shaft, and the first gear and the second gear are disposed between the opposite-to-output side support part and the output side support part. Further, it may be structured that the second bearing which is held in the second through-hole is mounted to the opposite-to-output side support part from an opposite side to the output side support part, and the urging member which urges the output shaft in the axial direction is fitted to the opposite-to-output side support part from the tip end side of the opposite-to-output side support part so that the second bearing is held in the second through-hole.

Further, it is preferable that the gear part comprises a first gear, which is fixed to the rotation shaft and which is made of metal, and a second gear which is fixed to the output shaft and which is made of resin. According to this structure, the first gear and the second gear are formed of different kinds of material and thus a friction coefficient between the first gear and the second gear can be reduced to restrain progress of wear. As a result, a service life time of the motor device can be improved.

In addition, it is preferable that the bearing which is mounted on the support part on which the urging member is attached is a radial bearing which supports the output shaft in a radial direction, and the other bearing which is mounted on the other of the support parts is a bearing which supports the output shaft in the radial direction and which is abutted with a shaft end face of the output shaft. According to the structured as described above, inclination of the output shaft can be prevented by means of that movement in the radial direction of the output shaft is restricted by the other bearing. In addition, the output shaft is sandwiched between the other bearing and the urging member in a state where a constant pressure is applied and thus the motor device in which rattling of the output shaft is restrained can be obtained.

Further, a stepping motor may be utilized as the motor main body. In this case, rotation amount of the output shaft can be easily controlled and an object to be driven is driven with a high degree of accuracy.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1(a) is a top plan view (partly cross-sectional view) showing the motor device and FIG. 1(b) is its side view in a short side direction.

FIG. 3(a) is its top plan view, FIG. 3(b) is a side view in its longitudinal direction, FIG. 3(c) is its bottom view, and FIG. 3(d) is a side view in its short side direction.

FIG. 7(a) is a view showing a case where hook parts are formed to be bent at an acute angle from side plate parts to a bottom face part side, and FIG. 7(b) is a view showing a case where the side plate parts are also formed to be bent at an acute angle from the bottom face part to an inner side.

DETAILED DESCRIPTION OF THE PREFERRED EMBODIMENTS

A motor device in accordance with an embodiment of the present invention will be described in detail below with reference to the accompanying drawings.

Figure 1A:
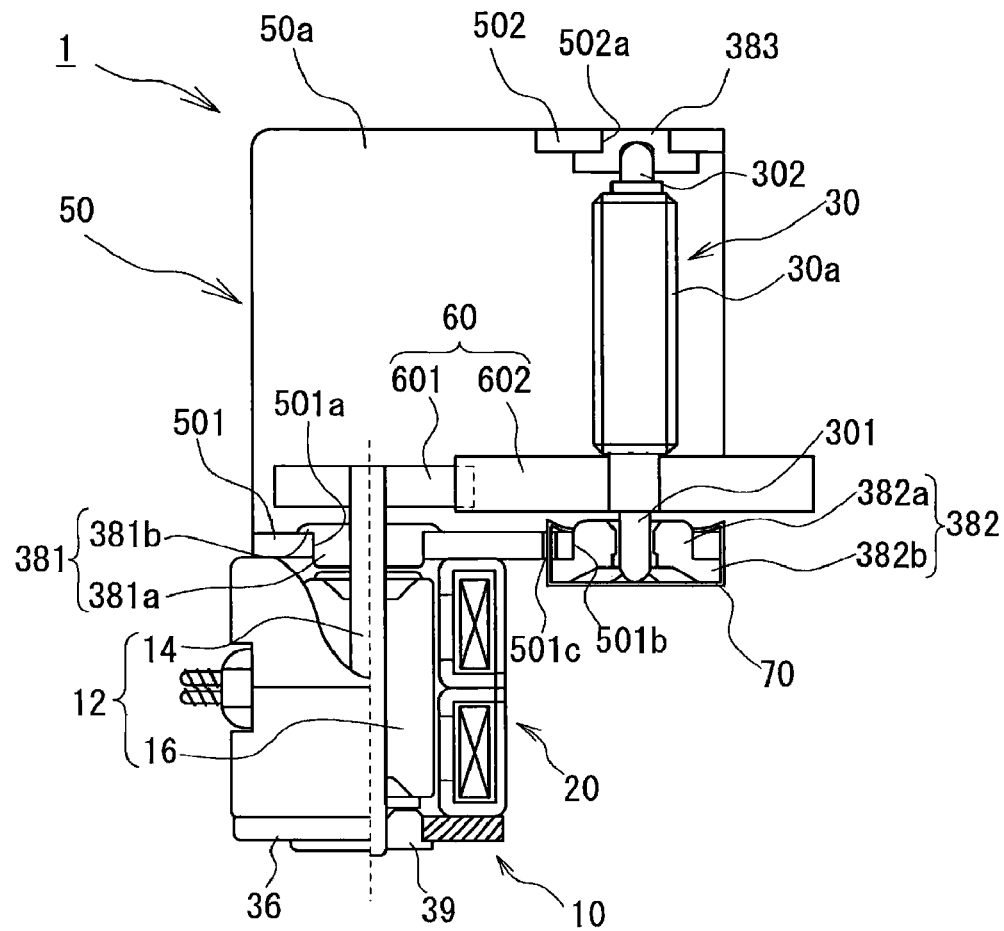
FIGS. 1(a) and 1(b) are explanatory views showing a structure of a motor device in accordance with an embodiment of the present invention.
Figure 1B:
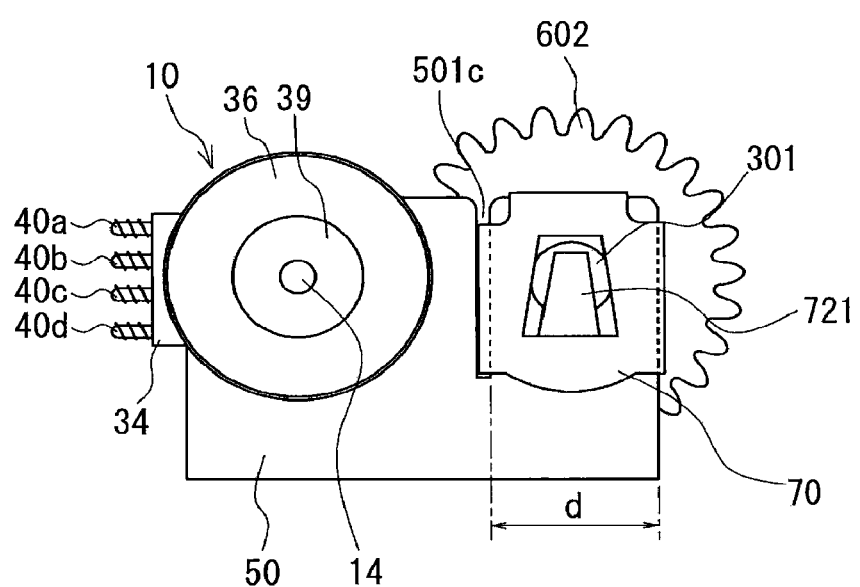
Figure 2:
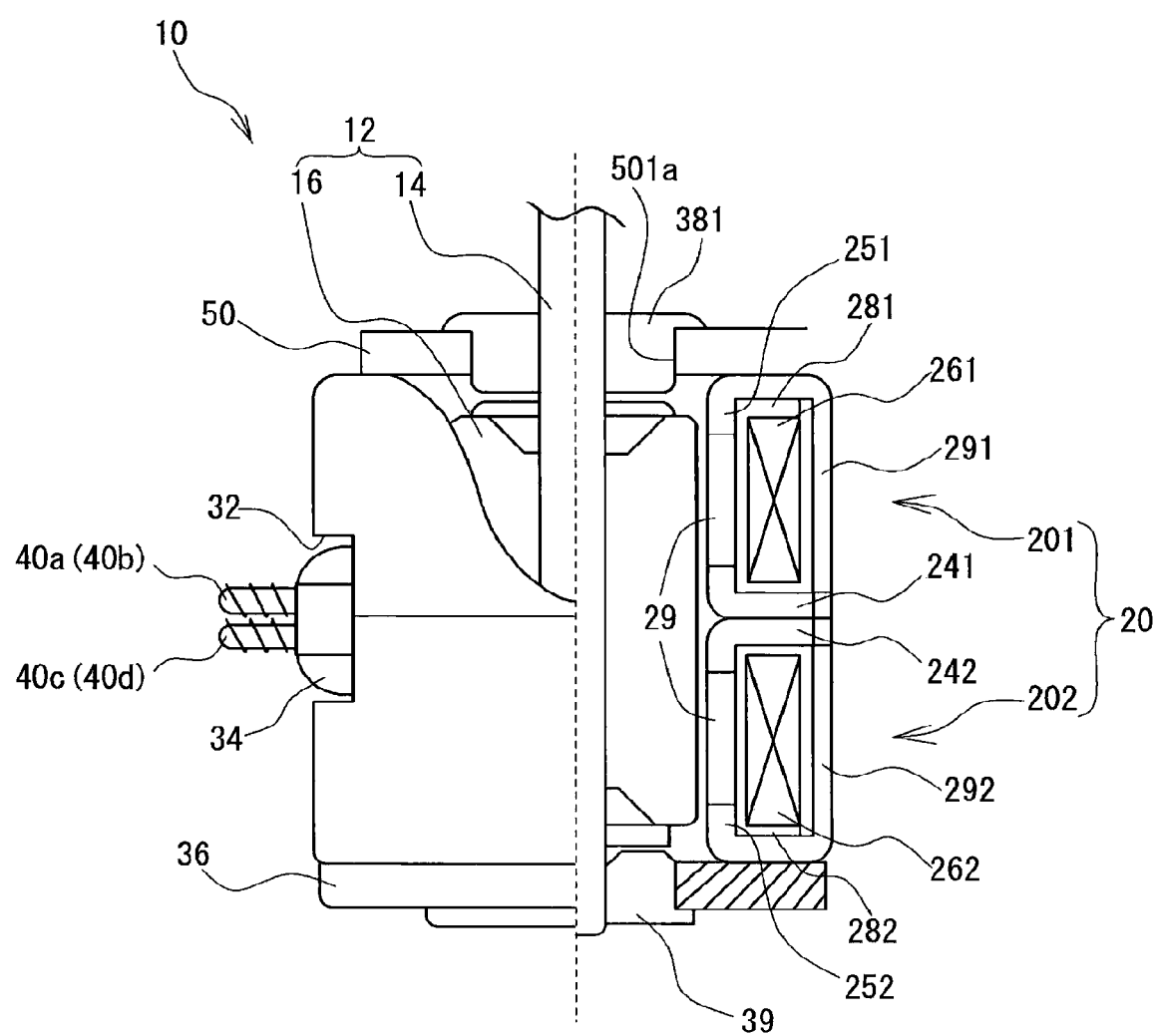
FIG. 2 is a partly cross-sectional view showing a motor main body of the motor device shown in FIG. 1(a).

FIGS. 1(a) and 1(b) are explanatory views showing a structure of a motor device 1 in accordance with an embodiment of the present invention. FIG. 1(a) is a top plan view (partly cross-sectional view) showing the motor device 1 and FIG. 1(b) is a side view showing an opposite-to-output side of the motor device 1 in a short side direction. FIG. 2 is a partly cross-sectional view showing a motor main body 10 of the motor device 1 shown in FIG. 1(a).

The motor device 1 in accordance with an embodiment of the present invention includes a motor main body 10 provided with a rotation shaft 14, an output shaft 30 on which a lead screw 30a is formed, a motor frame 50 in which the rotation shaft 14 and the output shaft 30 are rotatably supported, and a gear part 60 which transmits a rotary power of the rotation shaft 14 to the output shaft 30.

The motor main body 10 is provided with a structure of a commonly used stepping motor. Specifically, the motor main body 10 is structured of a rotor 12 provided with the rotation shaft 14 and a stator 20.

The rotor 12 is structured of the rotation shaft 14 and a permanent magnet 16. Specifically, the rotor 12 is structured so that the permanent magnet 16 on which an "N"-pole and an "S"-pole are alternately magnetized in a circumferential direction is fixed on an outer peripheral face on an opposite-to-output side of the rotation shaft 14. An output side of the rotation shaft 14 is supported in a radial direction by a first bearing 381 which is supported by the motor frame 50, and an opposite-to-output side of the rotation shaft 14 is supported in a radial direction by an opposite-to-output side bearing 39 which is fixed to a side plate 36. Further, a first gear 601 structuring the gear part 60 is fixed to a shaft end on the output side of the rotation shaft 14. The first gear 601 is located between an opposite-to-output side support part 501 and an output side support part 502 of the motor frame 50.

The stator 20 is structured of a first stator assembly 201 and a second stator assembly 202 which are disposed on an outer peripheral side of the permanent magnet 16 so as to be superposed in an axial direction of the rotation shaft 14.

As shown in FIG. 2, the first and the second stator assemblies 201 and 202 are structured of inner stator cores 241 and 242, coil bobbins 281 and 282 around which drive coils 261 and 262 are wound, and outer stator cores 251 and 252 which sandwich the coil bobbins 281 and 282 together with the inner stator cores 241 and 242.

A plurality of pole teeth 29 which is formed upright in an axial direction at equal intervals at an inner circumferential edge is formed in the respective inner stator cores 241 and 242 and the outer stator cores 251 and 252. The plurality of the pole teeth 29, which are respectively formed in the inner stator core 241 and the outer stator core 251, and in the inner stator core 242 and the outer stator core 252, are alternately and adjacently disposed to each other on the inner peripheral sides of the coil bobbins 281 and 282. Therefore, in this embodiment, the drive coil 261 is wound around the outer peripheries of the respective pole teeth 29 of the inner stator core 241 and the outer stator core 251 of the first stator assembly 201 in a circular ring shape through the coil bobbin 281. Similarly, the drive coil 262 is wound around the outer peripheries of the respective pole teeth 29 of the inner stator core 242 and the outer stator core 252 of the second stator assembly 202 in a circular ring shape through the coil bobbin 282.

Outer peripheral portions of the outer stator cores 251 and 252 are perpendicularly bent so as to cover the outer peripheries of the drive coils 261 and 262 so that they function as a motor case. The portions which cover the outer peripheries of the drive coils 261 and 262 are respectively referred to as a first motor case 291 and a second motor case 292. The first motor case 291 and the second motor case 292 are formed in a cylindrical shape by drawing working. Further, opening parts 32 which are cut in a predetermined size are formed in side wall faces of the first motor case 291 and the second motor case 292.

A terminal block 34 which is provided with terminal pins 40a through 40d for power supply is fixed at outer peripheral edges of the inner stator cores 241 and 242. The terminal block 34 is fixed to the outer peripheral edges of the inner stator cores 241 and 242 by insert-molding, press-fitting or the like. The terminal block 34 structured as described above is protruded from the opening part 32, which is formed in the side faces of the first motor case 291 and the second motor case 292. Further, coil ends of the drive coils 261 and 262 are connected to the terminal pins 40a through 40d.

A side plate 36 is fixed to an end face on the opposite-to-output side of the outer stator core 252. An opposite-to-output side bearing 39 as a radial bearing for supporting an opposite-to-output side shaft end 123 of the rotation shaft 12 in the radial direction is fixed to the side plate 36 by press-fitting or the like.

The output shaft 30 is a shaft for operating an object to be driven, and a lead screw 30a for connecting the output shaft 30 with the object to be driven is formed on its outer peripheral face. Further, shaft ends of the output shaft 30 (its opposite-to-output side is an opposite-to-output side shaft end 301 and its output side is an output side shaft end 302) are supported by a second bearing 382 and a third bearing 383. In addition, a second gear 602 structuring the gear part 60 together with the first gear 601 is fixed to the output shaft 30 between the lead screw 30a and the opposite-to-output side shaft end 301.

The motor frame 50 is a member which is formed so that both ends of a metal plate are bent at a right angle. A portion which is formed upright on the opposite-to-output side of a bottom plate part 50a formed in a flat plate shape and extended in the axial direction, is an opposite-to-output side support part 501, and a portion formed upright on the output side is an output side support part 502. As shown in FIG. 1(a), in this embodiment, the opposite-to-output side support part 501 is formed upright from an entire side edge on the opposite-to-output side of the bottom plate part 50a, and the motor main body 10 is fixed to an opposite-to-output side face of the opposite-to-output side support part 501. On the other hand, the output side support part 502 is not formed on a motor main body 10 side and is formed in a part of a side edge on the output side of the bottom plate part 50a. In other words, the output side support part 502 is formed upright only at a part on the output shaft 30 side.

A first through-hole 501a and a second through-hole 501b are formed in the opposite-to-output side support part 501. A groove 501c, which is cut out from an end part of the opposite-to-output side support part 501 to the bottom plate part 50a side, is formed between the first through-hole 501a and the second through-hole 501b. A width of the groove 501c is formed larger than a plate thickness of a metal plate which forms an urging member 70 described below. Further, the distance "d" (see FIG. 1(b)) between the groove 501c and a side edge of the opposite-to-output side support part 501 (side edge on a far side from the motor main body 10) is set to be a dimension so that the urging member 70 can be mounted.

A first bearing 381 which supports the output side of the rotation shaft 14 is attached to the first through-hole 501a by press-fitting or the like. Specifically, the first bearing 381 is attached to the first through-hole 501a by means of that a main body part 381a of the first bearing 381 is inserted into the first through-hole 501a and a flange part 381b which is extended from the main body part 381a in a radial direction is engaged with a periphery of the first through-hole 501a. The first bearing 381 is a so-called radial bearing which supports the rotation shaft 14 in the radial direction.

Further, a second bearing 382 which supports the opposite-to-output side shaft end 301 of the output shaft 30 is attached to the second through-hole 501b by using the urging member 70. Its mounting structure and mounting method will be described in detail below. The second bearing 382 is a so-called radial bearing for supporting the output shaft 30 in the radial direction and is structured of a cylindrical main body part 382a and a flange part 382b.

Figure 3A:
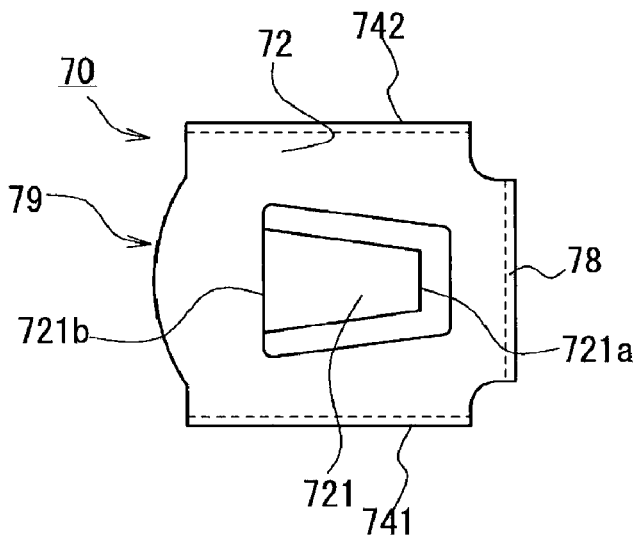
FIGS. 3(a) through 3(d) are explanatory views showing a structure of an urging member which is provided in the motor device shown in FIGS. 1(a) and 1(b).
Figure 3D:
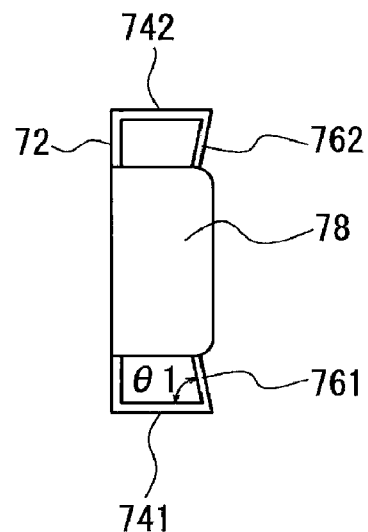
Figure 3B:
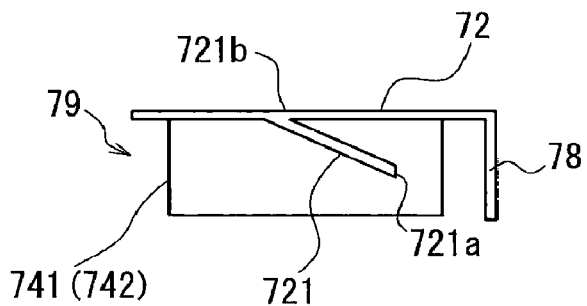
Figure 3C:
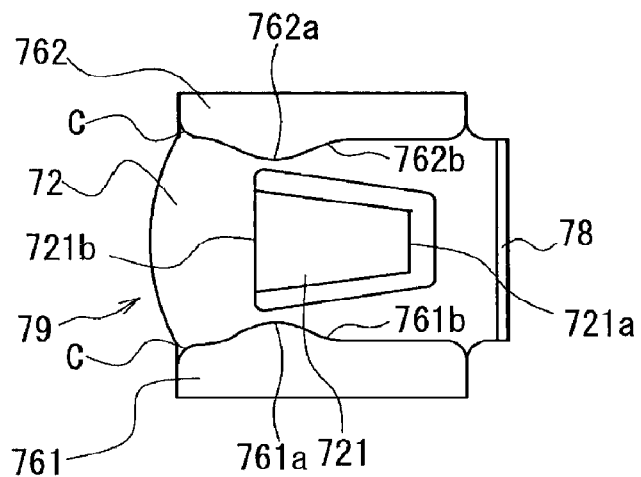

The urging member 70 for mounting the second bearing 382 is a press-worked product formed of a thin metal plate such as stainless steel which is elastically deformable so as to provide a spring property. FIG. 3(a) is a top plan view showing the urging member 70, FIG. 3(b) is its side view in its longitudinal direction, FIG. 3(c) is its bottom view, and FIG. 3(d) is its side view in its short side direction. As shown in FIGS. 3(a) through 3(d), the urging member 70 is structured of a bottom face part 72 provided with a spring part 721 which is cut in a tongue shape and is obliquely bent, a pair of side plate parts 741 and 742 which are bent from respective right and left side edges of the bottom face part 72 so as to face each other, a pair of hook parts 761 and 762 which are bent on inner sides from tip ends of a pair of the side plate parts 741 and 742, and a stopper part 78 which is bent from the bottom face part 72 to the axial line direction of the motor. Since the urging member 70 is structured to provide a spring property by utilizing a metal plate member, a pair of the side plate parts 741 and 742, a pair of the hook parts 761 and 762, and the like as well as the spring part 721 are respectively provided with a spring property.

The bottom face part 72 functions as a base portion of the urging member 70. The spring part 721 for urging the output shaft 30 to the opposite-to-output side is formed at a center portion of the bottom face part 72. The spring part 721 is formed to be bent on the hook parts 761 and 762 side, i.e., on the output side in a state where the urging member 70 is mounted on the opposite-to-output side support part 501 as shown in FIGS. 1(a) and 1(b) so that its tip end part 721a is located on a rear side with respect to a fitting direction (left direction in FIG. 3(a)) of the urging member 70 and a base end part 721b is located on a front side in the fitting direction.

The side plate parts 741 and 742 are formed as bent portions which are bent at a substantially right angle from side edges of the bottom face part 72 so as to face and parallel to each other. A dimension between a pair of the side plate parts 741 and 742 is set to be substantially equal to or a little larger than the distance "d" between the side edge of the opposite-to-output side support part 501 of the motor frame 50 and the groove 501c.

The hook parts 761 and 762 are bent portions which are bent inwardly from respective tip ends of the side plate parts 741 and 742. As shown in FIG. 3(c), end portions of the hook parts 761 and 762 are formed in a curved shape. Specifically, tip ends of the hook parts 761 and 762 located near the base end part 721b of the spring part 721 are formed with projecting parts 761a and 762a to reduce a distance between the hook parts 761 and 762. Further, tip ends of the hook parts 761 and 762 which are located on the stopper part 78 side from the projecting parts 761a and 762a are formed in a gradually inclined and curved shape from the protruded parts 761a and 762a to the stopper part 78 side. These portions are referred to as curved parts 761b and 762b. Further, tip ends of the hook parts 761 and 762 which are located on an open end 79 side from the protruded parts 761a and 762a are formed in tapered shapes which are inclined from the protruded parts 761a and 762a to the open end 79 side so that a distance between the tip ends of the hook parts 761 and 762 gradually becomes larger. Corner parts "C" of the hook parts 761 and 762 are respectively formed in an "R"-shape (round shape).

In this embodiment, a distance between the protruded parts 761a and 762a is set to be smaller than a diameter of the main body part 382a of the second bearing 382. Therefore, in the state where the curved parts 761b and 762b are abutted with the main body part 382a, the protruded parts 761a and 762a serve as a locking part for the urging member 70 to prevent from coming off. Further, the curved parts 761b and 762b are formed in a curved shape such that the main body part 382a is capable of being smoothly fitted between the curved parts 761b and 762b.

Further, the opposite-to-output side support part 501 and the second bearing 382 are pinched by the hook parts 761 and 762 and the bottom plate part 72. Therefore, as shown in FIG. 3(d), the hook parts 761 and 762 are bent a little larger than a right angle on the bottom face part 72 side from the side plate parts 741 and 742 so that the angle θ1 formed between the side plate parts 741 and 742 and the hook parts 761 and 762 is set to be an acute angle. Especially in this embodiment, a pair of the hook parts 761 and 762 is provided with a spring property. Therefore, shape may not deform even when a pair of the hook parts 761 and 762 are formed at an acute angle, and the opposite-to-output side support part 501 and the second bearing 382 are firmly sandwiched between the bottom plate part 72 and a pair of the hook parts 761 and 762.

The stopper part 78 is a bent portion which is bent at a substantially right angle from one side edge in a longitudinal direction of the bottom face part 72 (side edge on the tip end part 721a side of the spring part 721). In this embodiment, the other side edge of the bottom face part 72, which is referred to as an opened end 79, is largely opened as shown in FIG. 3(b). The stopper part 78 serves as a moving restriction part when the urging member 70 is mounted on the opposite-to-output side support part 501 of the frame 50, in other words, when the urging member 70 is made slide in a direction perpendicular to the axial direction, i.e., in the radial direction. Further, the stopper part 78 functions as a positioning part for determining an urging position of the spring part 721.

Figure 4A:
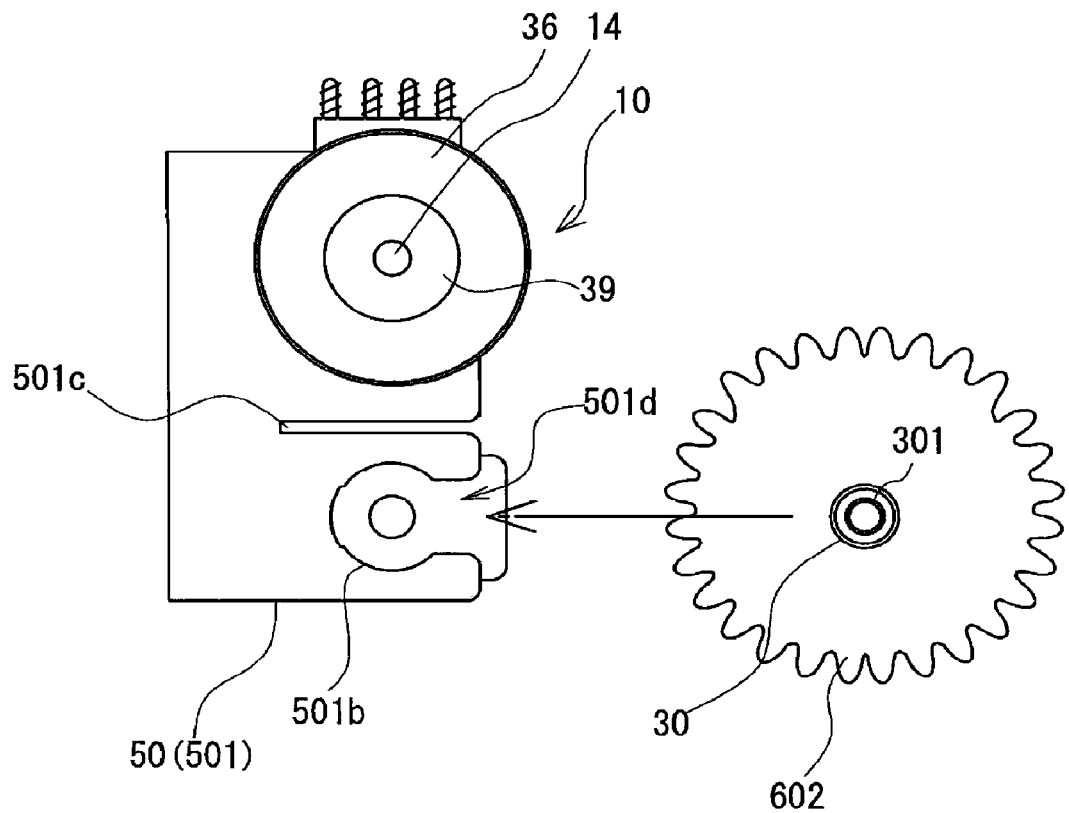
FIGS. 4(a) and 4(b) are explanatory views showing steps in which an output shaft and a second bearing are mounted on a motor frame (opposite-to-output side support part).

Mounting steps for the second bearing 382 (mounting structure) in which the urging member 70 structured as described above is used will be specifically described below with reference to FIGS. 4(a) and 4(b) and FIGS. 5(a) and 5(b). FIGS. 4(a) and 5(a) are side views showing the motor device 1 in the short side direction and FIGS. 4(b) and 5(b) are enlarged cross-sectional side views showing the opposite-to-output side support part 501 of the motor device 1 in the longitudinal direction.

Figure 4B:
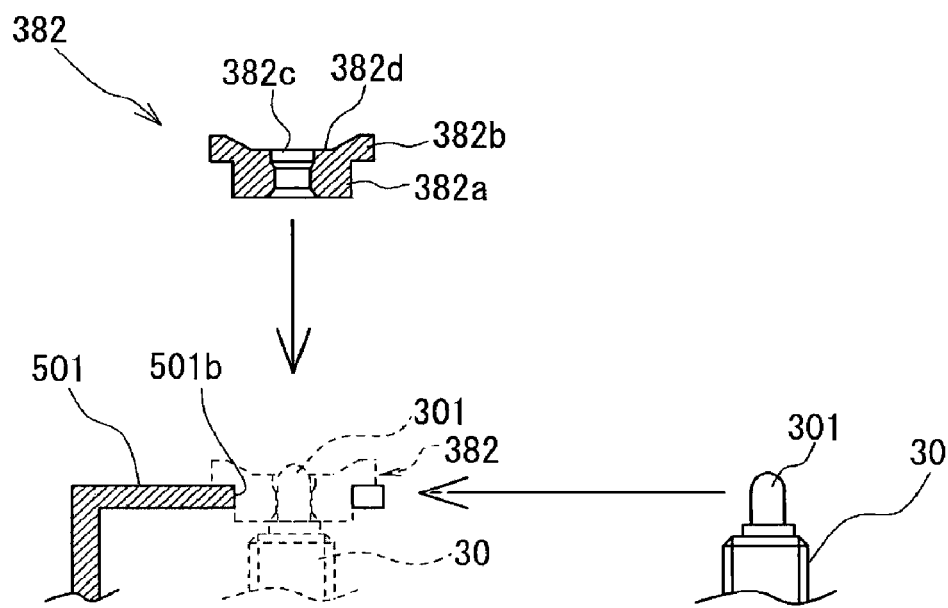
Figure 5A:
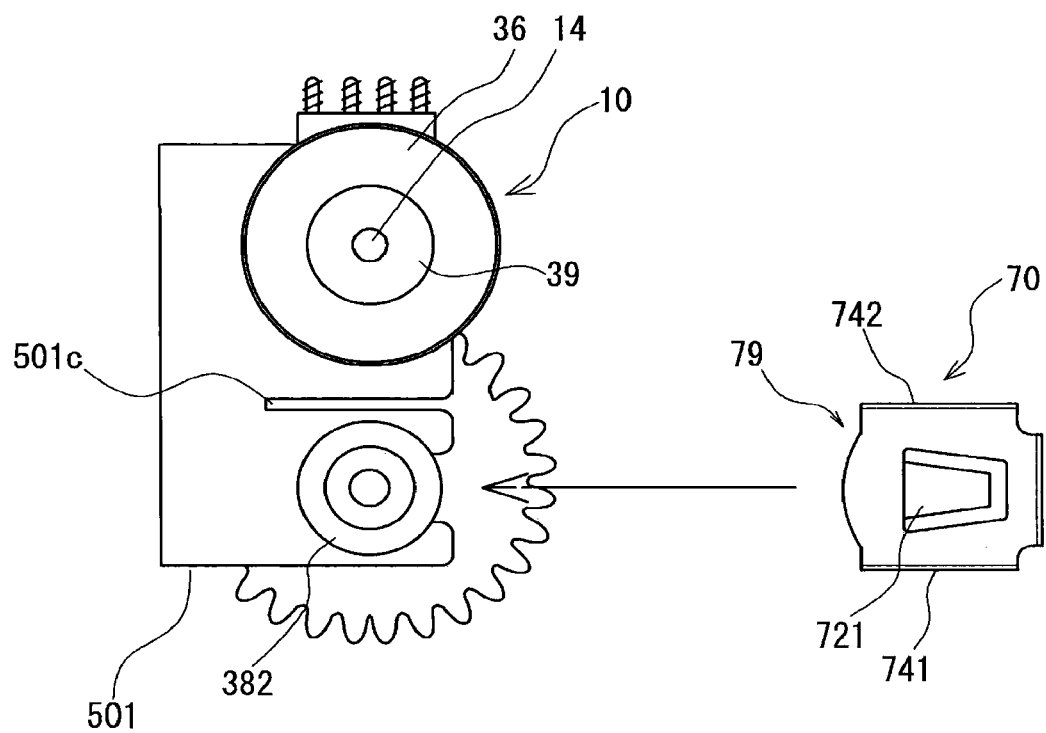
FIGS. 5(a) and 5(b) are explanatory views showing steps for mounting an urging member on the motor frame (opposite-to-output side support part).

First, as shown in FIGS. 4(a) and 4(b), the output shaft 30 is inserted into the second through-hole 501b of the opposite-to-output side support part 501 of the motor frame 50 from the tip end side of the opposite-to-output side support part 501. In this embodiment, a slit part 501d reaching to the second through-hole 501b is formed in the tip end portion of the opposite-to-output side support part 501. Therefore, the output shaft 30 can be easily located within the second through-hole 501b by passing the opposite-to-output side shaft end 301 of the output shaft 30 through the slit part 501d. In a conventional motor device, the output shaft 30 is provided with the second gear 602 and thus the output shaft 30 cannot be passed and mounted on the second through-hole 501b or the third through-hole 502a from the outer side of the opposite-to-output side support part 501 or the output side support part 502. Further, since the output shaft 30 is formed longer than a distance between the opposite-to-output side support part 501 and the output side support part 502 of the motor frame 50, the output shaft 30 cannot be mounted unless the output shaft 30 or the motor frame 50 is elastically deformed. On the other hand, in this embodiment, the opposite-to-output side shaft end 301 of the output shaft 30 can be located in the second through-hole 501b through the slit part 501d which is formed in the opposite-to-output side support part 501. Therefore, the output shaft 30 can be easily mounted.

After that, the main body part 382a of the second bearing 382 is inserted to the second through-hole 501b from the outer side of the opposite-to-output side support part 501. At the same time, the opposite-to-output side shaft end 301 of the output shaft 30 is inserted into the bearing hole 382c of the second bearing 382. In this manner, the second bearing 382 is positioned by means of that the flange part 382b is abutted with an end face on the opposite-to-output side of the opposite-to-output side support part 501, and the second bearing 382 is held in the second through-hole 501b in the state that a part of the main body part 382a is protruded to the output side. In this case, as shown in FIG. 4(b), the opposite-to-output side shaft end 301 of the output shaft 30 does not protrude from the end face on the opposite-to-output side of the flange part 382b but protrudes from a bottom face of a recessed portion 382d which is formed at a center of the flange part 382b.

Figure 5B:
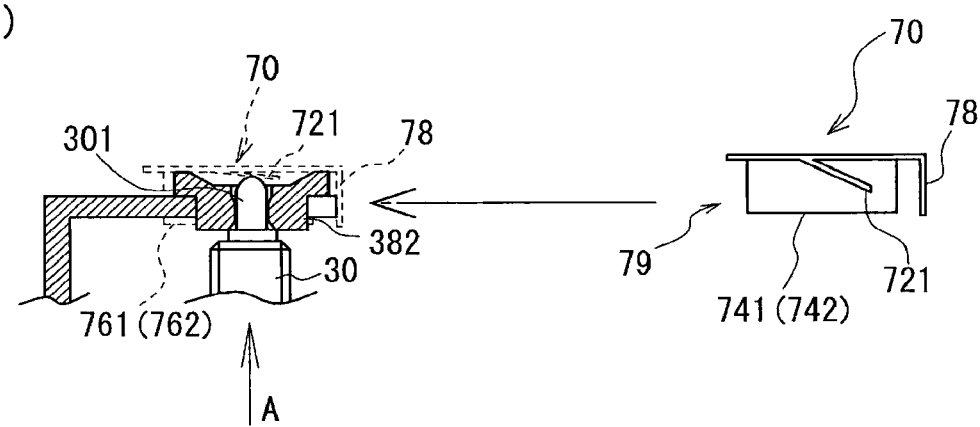

Next, as shown in FIGS. 5(a) and 5(b), the urging member 70 is fitted to the opposite-to-output side support part 501 from the open end 79 side. Specifically, the side plate part 741 of the urging member 70 is made to engage with a side edge of the opposite-to-output side support part 501 and the side plate part 742 is made to fit into the groove 501c. Then, the urging member 70 is made to slide from the tip end side of the opposite-to-output side support part 501 in a direction shown by the arrow, in other words, the urging member 70 is made to slide in the direction perpendicular to the output shaft 30 (radial direction). In the present embodiment, the corner parts "C" on the open end 79 side of the hook parts 761 and 762 are respectively formed in an "R"-shape (round shape). Therefore, the corner parts "C" of the hook parts 761 and 762 can restrict from being caught with the second bearing 382 and thus the urging member 70 can be smoothly slid.

Figure 6:
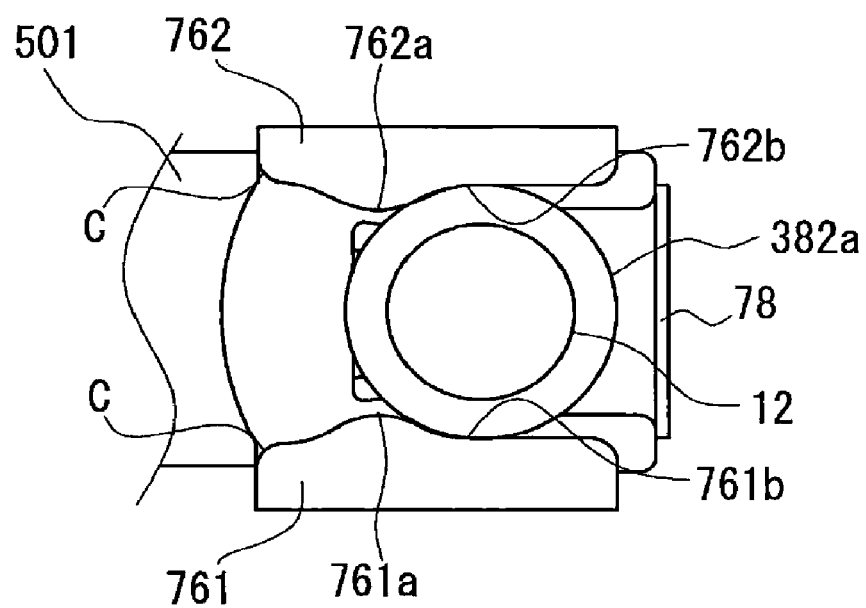
FIG. 6 is an enlarged view (viewed in the direction shown by the arrow "A" in FIG. 5(b) in which the urging member is mounted in a state where a main body part of the second bearing is sandwiched by hook parts (curved parts).

The urging member 70 is made to slide to a position where the stopper part 78 is abutted with the tip end of the opposite-to-output side support part 501. Then, as shown in FIG. 6 (viewed from the direction shown by the arrow "A" in FIG. 5(b)), the side plate parts 741 and 742 having a spring property are elastically deformed and widened on outer sides and then, the cylindrical main body part 382a of the second bearing 382 which is protruded from the output side face of the opposite-to-output side support part 501 is passed through between the protruded parts 761a and 762a, and the main body part 382a is fitted between and pinched by the curved parts 761b and 762b. In other words, the side plate parts 741 and 742 are provided with a spring property and thus, when the urging member 70 is slid to be mounted, the protruded parts 761a and 762a are widened on the outer sides at the time of abutting with the main body part 382a and then, the protruded parts 761a and 762a are returned to original positions when the main body part 382*a* is located between the curved parts 761*b* and 762*b*. Therefore, the urging member 70 is positioned at a predetermined position by means of that the curved parts 761*b* and 762*b* are abutted with the main body part 382*a* of the second bearing 382 as a reference. In addition, in the state where the urging member 70 is mounted on the opposite-to-output side support part 501, the protruded parts 761*a* and 762*a* function as a locking part which prevents the urging member 70 from coming off in the direction opposite to the slide direction. Therefore, according to the structure described above, the urging member 70 is hard to be come off in the direction opposite to the slide direction.

In this case, the spring part 721 is abutted with the opposite-to-output side shaft end 301 of the output shaft 30, which is protruded from the bottom face of the recessed portion 382*d*. Therefore, the output shaft 30 is directly urged in the output side direction from the opposite-to-output side by the spring part 721. In this manner, fixing of the second bearing 382 and mounting of the urging member 70 have finished.

In accordance with an embodiment of the present invention, a shape of the recessed portion 382*d* formed on the flange part 382*b* may be formed so that the spring part 721 is capable of being located in the recessed portion 382*d* to directly urge the output shaft 30. However, it is preferable that the shape of the recessed portion 382*d* is formed in a tapered shape in cross section like the embodiment described above. According to this structure, when the urging member 70 is to be mounted on the opposite-to-output side support part 501, the spring part 721 is prevented from strongly abutting with the output shaft 30 just after its elastic deformation is released and thus the spring part 721 is prevented from being deformed.

As described above, the urging member 70, i.e., the spring part 721 for urging the output shaft 30 in the output side is positioned at the predetermined position by means of that the curved parts 761*b* and 762*b* of the hook parts 761 and 762 are engaged with the main body part 382*a* of the second bearing 382. In other words, different from a conventional motor in which the urging member is positioned and fixed with the motor frame 50 (opposite-to-output side support part 501) as a reference, positional displacement of the relative position of the output shaft 30 and the urging member 70 hardly occurs and a pressurization position by the spring part 721 of the urging member 70 does not shift largely from the axial line of the output shaft 30. Accordingly, inclination of the urging direction to the output shaft 30 due to displacement from the center of the pressurization position can be suppressed and occurrence of rattling of the output shaft 30 due to shortage of amount of pressurization can be restricted.

Further, the output shaft 30 is urged to the output side by the spring part 721 of the urging member 70 which is abutted with the opposite-to-output side shaft end 301. In other words, the spring part 721 is capable of directly urging the output shaft 30 by the recessed portion 382*d* which is formed on the flange part 382*b* of the second bearing 382. Therefore, inclination, rattling and the like of the output shaft 30 are further restricted.

Figure 7A:
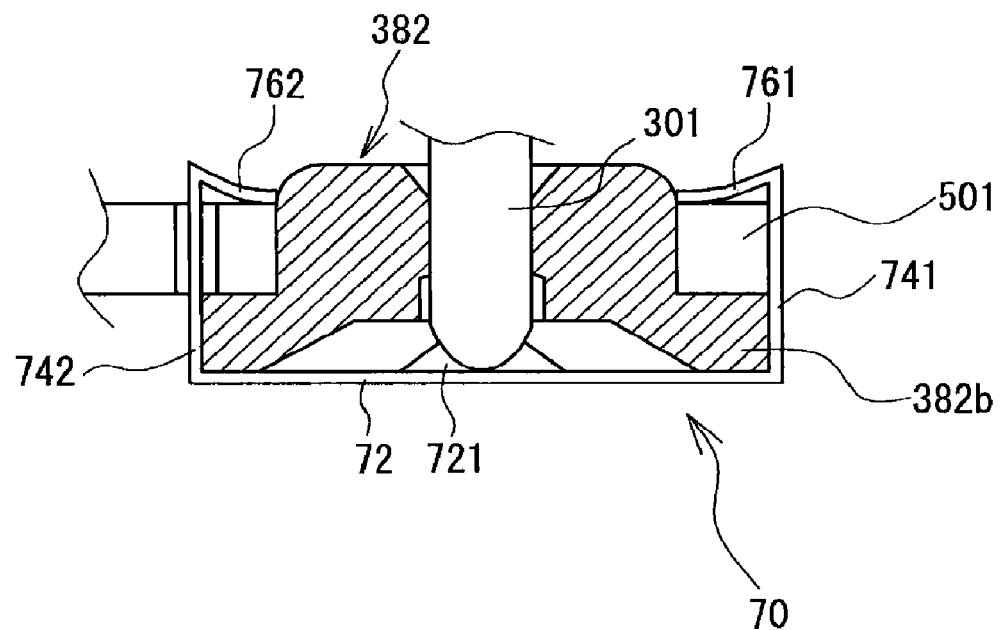
FIGS. 7(a) and 7(b) are explanatory enlarged cross-sectional views showing states where the urging member is mounted on a motor frame (opposite-to-output side support part).
Figure 7B:
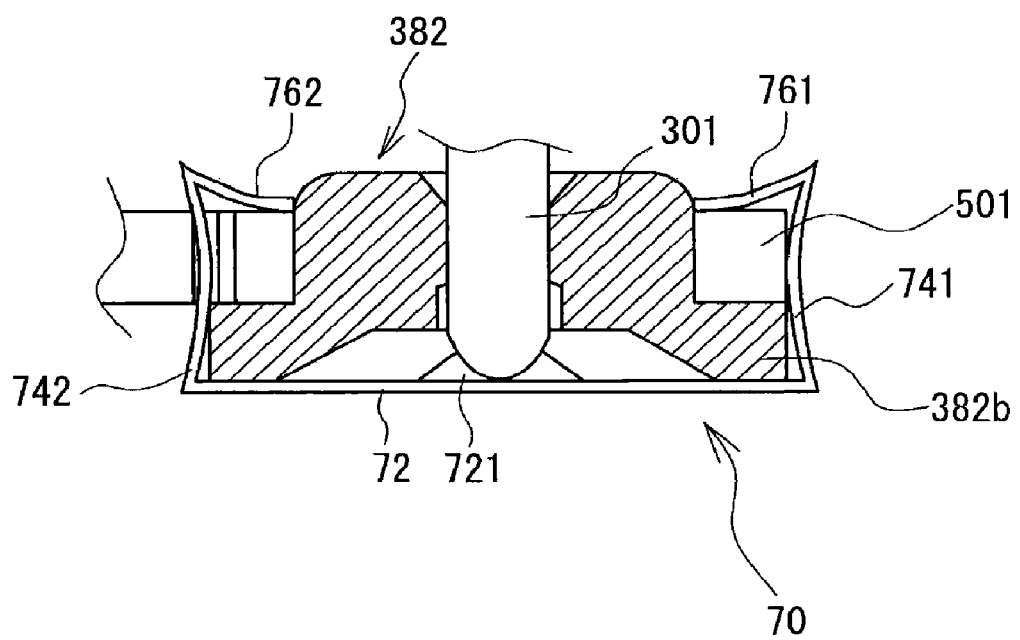

Further, when the urging member 70 is mounted, the flange part 382*b* of the second bearing 382 and the opposite-to-output side support part 501 are pinched between the bottom face part 72 and the hook parts 761 and 762 of the urging member 70. In this embodiment, as described above, the hook parts 761 and 762 are provided with a spring property and are formed to be bent from the side plate parts 741 and 742 to the bottom face part 72 side at an acute angle. Therefore, according to this embodiment, as shown in FIG. 7(*a*), the opposite-to-output side support part 501 and the flange part 382*b* are pinched between the bottom face part 72 and the hook parts 761 and 762 in the state where the hook parts 761 and 762 are acted as a plate spring. Therefore, the urging member 70 and the second bearing 382 are further firmly fixed to the opposite-to-output side support part 501. As a result, according to the structure described above, occurrence of falling, rattling and the like of the urging member 70 and the second bearing 382 can be restricted. Further, since the second bearing 382 is fixed to the opposite-to-output side support part 501 of the motor frame 50 as described above, the second bearing 382 is not required to be press-fitted to the second through-hole 501*b*. In other words, according to this embodiment, the shape of the bearing hole 382*c* of the second bearing 382 is not deformed by press fitting and thus the output shaft 30 can be supported with a high degree of accuracy.

In accordance with an embodiment of the present invention, when the side plate parts 741 and 742 of the urging member 70 are formed to be bent at an acute angle on the inner sides from the bottom face part 72, the urging member 70 and the second bearing 382 are further firmly fixed. In other words, as shown in FIG. 7(*b*), the side plate parts 741 and 742 as well as the hook parts 761 and 762 act as a plate spring and, in this state, the opposite-to-output side support part 501 and the flange part 382*b* are pinched between the bottom face part 72 and the hook parts 761 and 762. As a result, the urging member 70 and the second bearing 382 are further firmly fixed.

Further, in this embodiment, since the stopper part 78 is formed in the urging member 70, efficiency of assembling work which is a sliding and mounting work of the urging member 70 is improved. In other words, the stopper part 78 functions as a moving restriction part when the urging member 70 is slid to mount on the opposite-to-output side support part 501 and, in addition, the stopper part 78 also functions as a positioning part for determining an urging position of the spring part 721. Therefore, positioning accuracy of the urging member 70 is improved and mounting state of the urging member 70 can be stabilized. Further, in this embodiment, the urging member 70 is structured so that the urging member 70 is capable of sliding from the tip end of the opposite-to-output side support part 501 to be mounted. Therefore, in comparison with a case, for example, when the urging member 70 is mounted in the axial direction of the output shaft 30, a problem in which a bending load is applied to the motor frame 50 (opposite-to-output side support part 501) to deform the shape of the motor frame 50 is reduced.

Further, as described above, the spring part 721 is formed so that its tip end part 721*a* is located on the rear side in the mounting direction of the urging member 70 and its base end part 721*b* is located on the front side in the mounting direction. Therefore, when the urging member 70 is slid to be mounted, the tip end part 721*a* of the spring part 721 which is cut and bent from the bottom face part 72 is not caught by the second bearing 382 and thus workability of mounting work of the urging member 70 is satisfactory. Further, a problem is prevented, in which the spring part 721 is caught by the second bearing 382 to be deformed and, as a result, pressurization to the output shaft 30 becomes insufficient.

As described above, the second bearing 382 is mounted on the opposite-to-output side support part 501. On the other hand, a third through-hole 502*a* is formed in the output side support part 502. A third bearing 383 which supports an output side shaft end 302 of the output shaft 30 is mounted on the third through-hole 502*a* by press-fitting or the like. The third bearing 383 is, similarly to the second bearing 382, mounted so that its center is located on the axial line of the output shaft 30.

Figure 8:
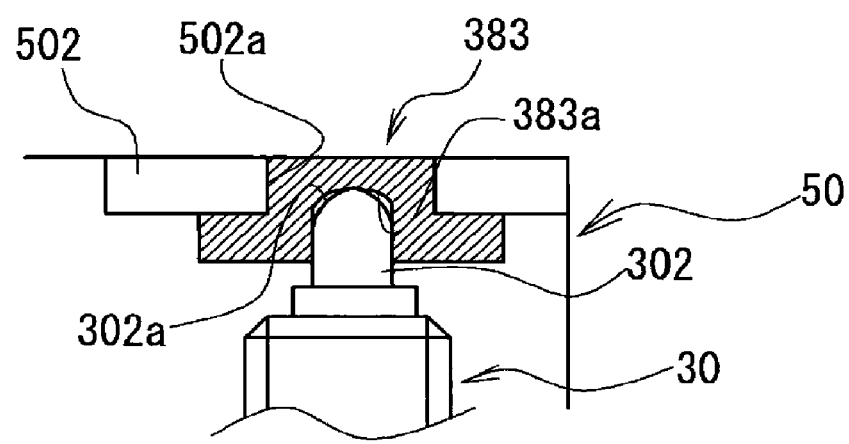
FIG. 8 is an enlarged view showing a third bearing which is mounted on an output side support part of the motor frame.

FIG. 8 is an enlarged view showing the third bearing 383 which is mounted on the output side support part 502. The third bearing 383 is a bearing which supports the output shaft 30 in a radial direction and whose bottom face 383a is abutted with an output side shaft end face 302a of the output shaft 30 to support it. As described above, in this embodiment, the output shaft 30 is urged to the output side from the opposite-to-output side. However, a bearing is used, which is capable of receiving a load in the axial line direction of the output shaft 30 by the bottom face 383a and thus the output shaft 30 is pinched between the third bearing 383 and the urging member 70 to be supported in the state where a constant pressure is applied by the spring part 721 of the urging member 70. As a result, rattling of the output shaft 30 is suppressed and torque loss, noise and the like of the motor device 1 can be reduced. Further, the third bearing 38 is provided with a flange part similarly to the second bearing 382 and the flange part is abutted with an inner side face of the output side support part 502, in other words, with a side face which is located between the output side support part 502 and the opposite-to-output side support part 501. Therefore, a length dimension of the motor device 1 can be suppressed and, in addition, the third bearing 383 is prevented from coming out by the urging force of the urging member 70.

The motor frame 50 on which the first bearing 381 through the third bearing 383 are mounted is fixed to the stator 20 by means of that its opposite-to-output side support part 501 is spot-welded to the outer stator core 251.

The gear part 60 comprises the first gear 601 and the second gear 602. As shown in FIG. 1(a), in this embodiment, the second gear 602 is formed larger than the first gear 601 in diameter and a rotary power applied to the rotation shaft 14 is decelerated with a predetermined reduction gear ratio to be transmitted to the output shaft 30.

In the motor device 1 in accordance with an embodiment of the present invention, as described above, both of the first bearing 381 supporting the output side of the rotation shaft 14 and the second bearing 382 supporting the opposite-to-output side of the output shaft 30 are held by one piece of the opposite-to-output side support part 501 formed in the motor frame 50 and thus a high degree of accuracy of a relative position of the output shaft 30 to the rotation shaft 14 can be obtained. Therefore, a problem is prevented, in which, for example, engagement of the first gear 601 fixed to the rotation shaft 14 and the second gear 602 fixed to the output shaft 30 with each other becomes tight, or a play between the gears 601 and 602 becomes too large. Therefore, although the gears are used, smooth rotations of the rotation shaft 14 and the output shaft 30 are obtained. Further, engaging (meshing) accuracy of the first gear 601 with the second gear 602 can be set as designed and thus occurrence of noise and vibration due to rattling like the conventional example can be suppressed.

Further, in this embodiment, the first gear 601 is formed of metal such as brass. Further, the second gear 602 is formed of resin such as polyacetal (POM). When the first gear 601 and the second gear 602 are formed of different kinds of material as described above, a friction coefficient between the first gear 601 and the second gear 602 can be reduced to decrease a progress speed of wear. As a result, a service life time of the motor device 1 can be improved.

In accordance with an embodiment of the present invention, in order to obtain an effect for reducing a friction coefficient between the first gear 601 and the second gear 602, it may be structured that the first gear 601 is made of resin and the second gear 602 is made of metal. However, in a case of a small motor whose motor main body 10 is extremely small, it is preferable that the first gear 601 is made of metal and the second gear 602 is made of resin as described above. This is because that, as the size of the motor main body 10 is reduced, the rotation shaft 14 becomes thinner and thus, when the first gear 601 is not made of metal, a sufficient fixed strength of the first gear 601 to the rotation shaft 14 is unable to be secured by press fitting. Further, when it is structured that rotation of the rotation shaft 14 is decelerated to be transmitted to the output shaft 30 like the embodiment described above, the first gear 601 becomes smaller than the second gear 602. Therefore, a structure in which the small first gear 601 is made of metal to which a cutting work is capable to perform and the large second gear 602 is made of resin which is easily molded is superior in quality and manufacturing cost for the motor device 1.

As described above, in the motor device 1 in accordance with an embodiment of the present invention, both of the first bearing 381 supporting the output side of rotation shaft 14 and the second bearing 382 supporting the opposite-to-output side of the output shaft 30 are held by the opposite-to-output side support part 501 which is provided in the motor frame 50. As a result, accuracy of the relative position of the output shaft 30 to the rotation shaft 14 is remarkably improved and thus noise and vibration during driving of the motor device 1 are reduced and accuracy of rotation amount control for the output shaft can be improved.

Further, in the embodiment described above, the urging member 70 urging the output shaft 30 in the axial direction is mounted on the opposite-to-output side support part 501. Therefore, the output shaft 30 is supported in the motor frame 50 through the urging member 70 in a stable state that the output shaft 30 is sandwiched between the spring part 721 of the urging member 70 and the third bearing 383. As a result, inclination and rattling of the output shaft 30 can be prevented and thus an object to be driven can be operated smoothly. Further, since the second bearing 382 is fixed to the opposite-to-output side support part 501 of the motor frame 50 as described above, the second bearing 382 is not required to press-fit into the second through-hole 501b. In other words, according to this embodiment, since the second bearing 382 is not deformed by press fitting, the output shaft 30 is supported with a high degree of accuracy.

In addition, the slit part 501d reaching to the second through-hole 501b is formed in the tip end of the opposite-to-output side support part 501 to which the urging member 70 is attached. Therefore, the output shaft 30 is easily located at a predetermined position by means of that the opposite-to-output side shaft end 301 of the output shaft 30 is passed through the slit part 5old. The output shaft 30 is formed longer than the distance between the opposite-to-output side support part 501 and the output side support part 502 of the motor frame 50. Therefore, in the conventional example, the output shaft 30 cannot be mounted unless the output shaft 30 or the motor frame 50 is elastically deformed. However, according to this embodiment, the output shaft 30 can be easily mounted by passing it through the slit part 501d formed in the opposite-to-output side support part 501.

Further, in the embodiment described above, in order to transmit a rotary power from the rotation shaft 14 to the output shaft 30, the first gear 601 fixed to the rotation shaft 14 is made of metal and the second gear 602 fixed to the output shaft 30 is made of resin. Therefore, a friction coefficient between the first gear 601 and the second gear 602 becomes small and thus progress of wear of the gear is restrained and, as a result, a service life time of the motor device 1 can be longer.

In addition, the third bearing 383 which faces the second bearing 382 on which the urging member 70 is mounted is a bearing which supports the output shaft 30 in the radial direction and supports it by making the shaft end face 302a of the output shaft 30 abut with the bottom face 383a. Therefore, inclination of the output shaft 30 is prevented because movement in the radial direction of the output shaft 30 is restricted. In addition, the output shaft 30 is sandwiched between the bottom face 383a of the third bearing 383 and the spring part 721 of the urging member 70 in a state where a constant pressure is applied and thus the motor device 1 in which rattling of the output shaft 30 is restrained is obtained.

Further, since the motor main body 10 is a stepping motor, rotation amount of the output shaft 30 is easily controlled and an object to be driven can be driven with a high degree of accuracy.

Further, in the embodiment described above, the output shaft 30 is mounted while being urged by the urging member 70 and thus its inclination and rattling are prevented. In other words, a high relative positional accuracy of the output shaft 30 to the rotation shaft 14 which is obtained by the above-mentioned structure is maintained by supporting the output shaft 30 by using the urging member 70.

Although the present invention has been shown and described with reference to specific embodiments, various changes and modifications will be apparent to those skilled in the art from the teachings herein.

For example, in the embodiment described above, in the second bearing 382 and the third bearing 383 which support the output shaft 30, the second bearing 382 is mounted by the urging member 70. However, it may be structured so that the third bearing 383 is mounted by using the urging member 70. In this case, the output side shaft end 302 of the output shaft 30 is urged on the opposite-to-output side by the urging member 70 and the opposite-to-output side shaft end 301 is supported in the radial direction and in the axial direction of the output shaft 30 by the second bearing 382. Further, the slit part 501d is formed in the output side support part 502.

Further, in the embodiment described above, the gear part 60 is structured of the first gear 601 and the second gear 602. However, one or more gears may be further disposed between the first gear 601 and the second gear 602.

In addition, in the embodiment described above, the motor main body 10 is a stepping motor but another kind of motor such as a DC motor may be used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor device comprising:
a motor main body which is provided with a stator part and a rotation shaft extended from the stator part;
an output shaft which is provided with a lead screw part for operating an object to be driven;
a motor frame which is provided with an opposite-to-output side support part that supports the stator part and an opposite-to-output side of the output shaft, and which is provided with an output side support part which is disposed so as to face the opposite-to-output side support part for supporting an output side of the output shaft, and the motor frame being formed of one piece of a metal plate and both ends of the metal plate being bent at a right angle so that the metal plate is comprised of the opposite-to-output side support part, the output side support part and a bottom plate part between the opposite-to-output side support part and the output side support part;
a gear part for transmitting a driving force of the rotation shaft to the output shaft; and
an urging member which is mounted on one of the opposite-to-output side support part and the output side support part for urging the output shaft in an axial direction;
wherein the opposite-to-output side support part is formed with a first through-hole for penetrating the rotation shaft, and a first bearing which rotatably supports the rotation shaft is held in the first through-hole; and
wherein the opposite-to-output side support part is further formed with a second through-hole which holds a second bearing that rotatably supports the opposite-to-output side of the output shaft;
wherein the output side support part is formed at a position facing the second through-hole with a third through-hole which holds a third bearing that supports the output side of the output shaft; and
wherein one of the second bearing and the third bearing which is mounted on an urging member side is a radial bearing for supporting the output shaft in a radial direction, and an other of the second bearing and the third bearing is a bearing which supports the output shaft in the radial direction and which is abutted with a shaft end face of the output shaft against an urging force of the urging member.

2. The motor device according to claim 1, wherein
one of the support parts on which the urging member is mounted is formed with a slit part which is formed from a tip end of the one of the support parts so as to reach to the through-hole that is formed in the one of the support parts.

3. The motor device according to claim 1, wherein
a slit part is formed from a tip end of the opposite-to-output side support part to the second through-hole, and
the urging member is mounted on the opposite-to-output side support part so that the opposite-to-output side of the output shaft which is supported by the second bearing is urged in the axial direction.

4. The motor device according to claim 3, wherein
the gear part comprises a first gear fixed to the rotation shaft and a second gear fixed to the output shaft, and
the first gear and the second gear are disposed between the opposite-to-output side support part and the output side support part.

5. The motor device according to claim 4, wherein
the second bearing which is held in the second through-hole is mounted in the opposite-to-output side support part from an opposite side to the output side support part, and the urging member which urges the output shaft in the axial direction is fitted to the opposite-to-output side support part from the tip end side of the opposite-to-output side support part so that the second bearing is held in the second through-hole.

6. The motor device according to claim 5, wherein the first gear is made of metal and the second gear is made of resin.

7. The motor device according to claim 1, wherein the gear part comprises a first gear, which is fixed to the rotation shaft and which is made of metal, and a second gear which is fixed to the output shaft and which is made of resin.

8. The motor device according to claim 1, wherein the motor main body is a stepping motor.

* * * * *